J. H. MEISSNER.
BOLT.
No. 36,014.  Patented July 29, 1862.
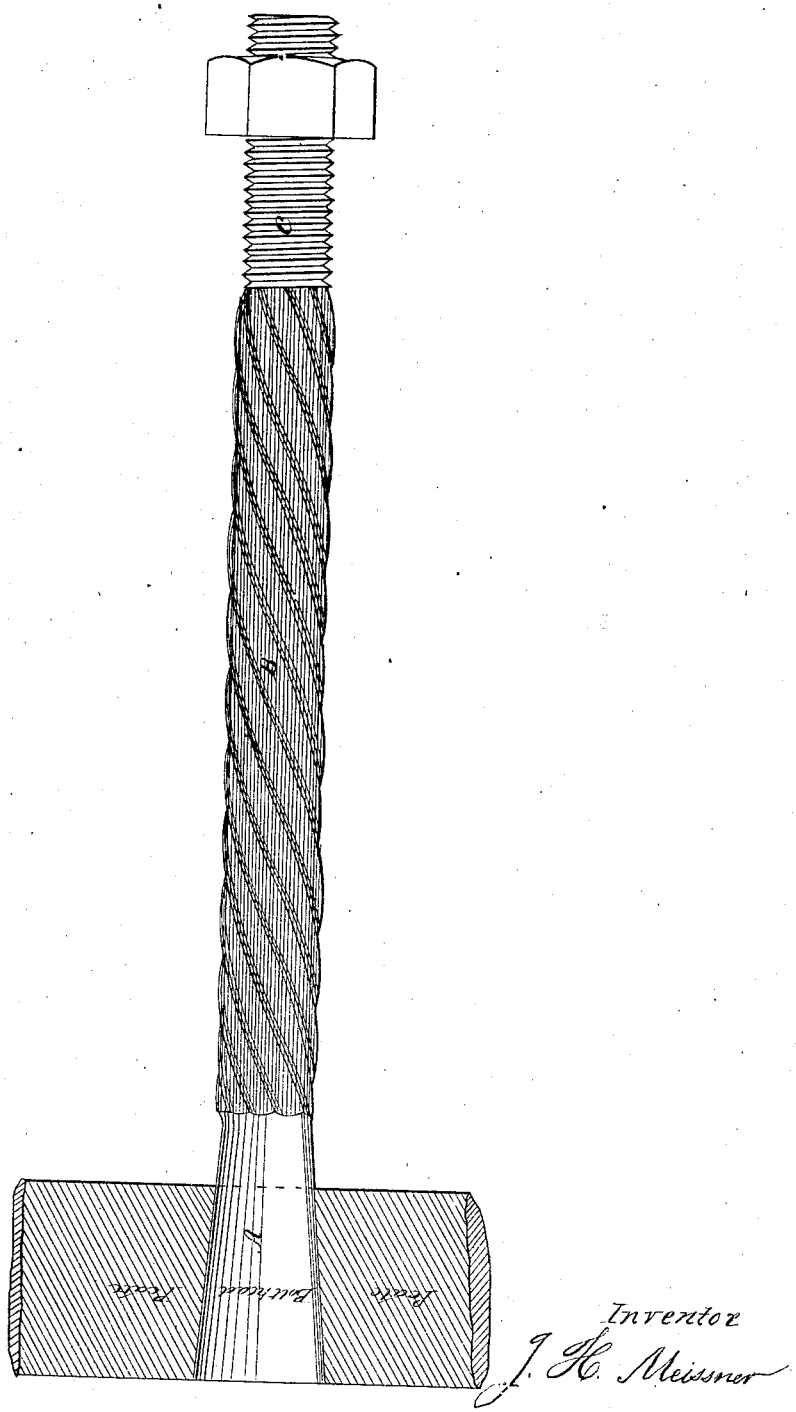

UNITED STATES PATENT OFFICE.

JULIUS H. MEISSNER, OF JERSEY CITY, NEW JERSEY.

IMPROVEMENT IN BOLTS.

Specification forming part of Letters Patent No. 36,014, dated July 29, 1862.

*To all whom it may concern:*

Be it known that I, JULIUS H. MEISSNER, of Jersey City, Hudson county, State of New Jersey, have invented a new method of constructing bolts for affixing armor-plates to vessels; and I do hereby declare that the following is a full, clear, and exact description of the same, reference being made to the annexed drawing, making a part of this specification, and which represents a side view of a bolt of this construction.

When plates of iron are affixed to the side of a vessel by means of the ordinary rigid screw-bolts, the impact of heavy projectiles has been found by experiment to shatter or break off the bolts at or near the head.

When the plates are very thick, it becomes necessary to increase the size of the bolts in order to support the augmented weight and hold the parts firmly in their proper position. This increase in the size of the bolts is accompanied by an increased rigidity, so that a blow from a heavy projectile will in a greater degree be expended injuriously upon the head of the bolt.

It is not necessary that the blow should fall directly upon the bolt to produce this injury, for violent concussions upon the plates may be injuriously resisted by the rigidity of the bolts, and even the shocks caused by the great weight of the plates when the ship is working in a sea may tend to the same results.

To obviate this difficulty is the purpose of my invention, which consists in making the body or shank of the bolt of a collection of wires so twisted or placed together that while the bolt shall have all the required tensile strength, it shall also possess a certain degree of elasticity, especially in the direction of its length, so that the rigid resistance is more nearly equal throughout all parts of the structure. The best arrangement of wire for this purpose is that found in "wire rope," which, moreover, as an article of commerce, is to be procured in quantity, and, when properly made, of the best material.

The manner in which I prefer to carry out my invention is to take a piece of good wire rope of proper diameter to afford the required tensile strength and of suitable length to make the desired bolt. At one end the wires are then to be welded together to form a solid mass for the length necessary to form the screw C, and the thread cut thereon to receive a nut in the usual manner of screw-bolts. The wires at the other end are also to be welded together to form a solid mass, and "upset," or otherwise so disposed as to form an appropriate head, A. Thus the metal at so much of one end of the bolt as is necessary to form a head or attachment to the armor-plate and at the other to form a screw or thread for a nut is solid, while all between those points remains as a wire rope, B, and possesses, of course, its proper elasticity.

Instead of welding and forging the wires to form the tapering head A of the bolt, they may be spread out and wedges driven in between them from the outside, so as to cause the whole mass to conform to the conical hole in the plate, and then covered, if necessary, by any suitable kind of metallic or other packing.

The material forming wire rope is, by reason of its mode of manufacture, of excellent quality, since only good and tenacious kinds of iron can stand the process of wire-drawing, the tension exerted being in fact a test of the strength of the material; hence bolts constructed in the method invented by me will have the best and strongest metal throughout their length, while the shank has besides the elasticity due to wire rope.

What I claim as my invention, and desire to secure by Letters Patent, is—

The method of constructing a screw-bolt of wire in such a manner that with a solid screw and proper head the shank or intermediate portion shall retain a certain degree of elasticity not possessed by an ordinary solid bolt.

J. H. MEISSNER.

Witnesses:
S. H. MAYNARD,
A. F. BRITTON.